United States Patent [19]

Holmes et al.

[11] Patent Number: 4,520,575
[45] Date of Patent: Jun. 4, 1985

[54] IMPINGEMENT OVEN AND METHOD

[75] Inventors: Donald P. Holmes; David I. McDonald, both of Cincinnati, Ohio

[73] Assignee: Cincinnati Milacron Inc., Cincinnati, Ohio

[21] Appl. No.: 554,967

[22] Filed: Nov. 25, 1983

[51] Int. Cl.³ .............................................. F26B 3/00
[52] U.S. Cl. .......................................... 34/23; 34/31; 34/151; 34/216
[58] Field of Search .................. 34/155, 156, 160, 242, 34/216, 151, 52, 219, 236, 23, 31; 198/859

[56] References Cited

U.S. PATENT DOCUMENTS

| | | | |
|---|---|---|---|
| 1,999,066 | 4/1935 | Stenfors | 198/84 |
| 2,331,042 | 10/1943 | Parkes | 34/160 |
| 2,414,502 | 1/1947 | Willcox | 34/197 |
| 2,908,234 | 10/1959 | Naylor | 107/55 |
| 2,928,124 | 3/1960 | Hugger | 18/19 |
| 3,297,176 | 1/1967 | Temple | 198/859 |
| 3,371,428 | 3/1968 | Thygeson et al. | 34/158 |
| 3,403,454 | 10/1968 | Smith, Jr. | 34/155 |
| 3,633,281 | 1/1972 | Vits | 34/1 |
| 3,758,960 | 9/1973 | McCreary et al. | 34/156 |
| 3,999,306 | 12/1976 | Koch et al. | 34/225 |
| 4,096,953 | 6/1978 | Kellermann et al. | 214/1 |
| 4,133,625 | 1/1979 | Kellermann et al. | 214/1 |
| 4,183,979 | 1/1980 | Kellermann et al. | 214/1 |
| 4,311,458 | 1/1982 | Caratsch | 34/216 |
| 4,313,266 | 2/1982 | Tam | 34/236 |
| 4,341,024 | 7/1982 | Witkin | 34/155 |
| 4,352,249 | 10/1982 | Rose | 34/212 |
| 4,445,281 | 5/1984 | Aigoo | 34/58 |

FOREIGN PATENT DOCUMENTS

| | | |
|---|---|---|
| 2103622 | 9/1972 | Fed. Rep. of Germany . |
| 2743184 | 3/1979 | Fed. Rep. of Germany . |
| 2100875 | 3/1972 | France . |
| 1022318 | 3/1966 | United Kingdom . |

Primary Examiner—Larry I. Schwartz
Attorney, Agent, or Firm—Daniel P. Worth

[57] ABSTRACT

An impingement oven wherein a carrier-type conveyor passes between hot air plenums located above and below the conveyor. Horizontally adjacent plenums have their fans located in an off-set position to overhang the other one of the pair. Each plenum has a nozzle plate to direct heated air toward the conveyor so that the air flow is substantially perpendicular to the conveyor and such workpiece(s) as may be thereon. An oven module having four sets of plenums and four conveyors in the same enclosure is described. A plurality of such modules serially arranged provide a multizone oven. The oven is especially suited to heating flat workpieces of thermoplastic resin which are to be processed elsewhere into hollow objects such as containers.

22 Claims, 20 Drawing Figures

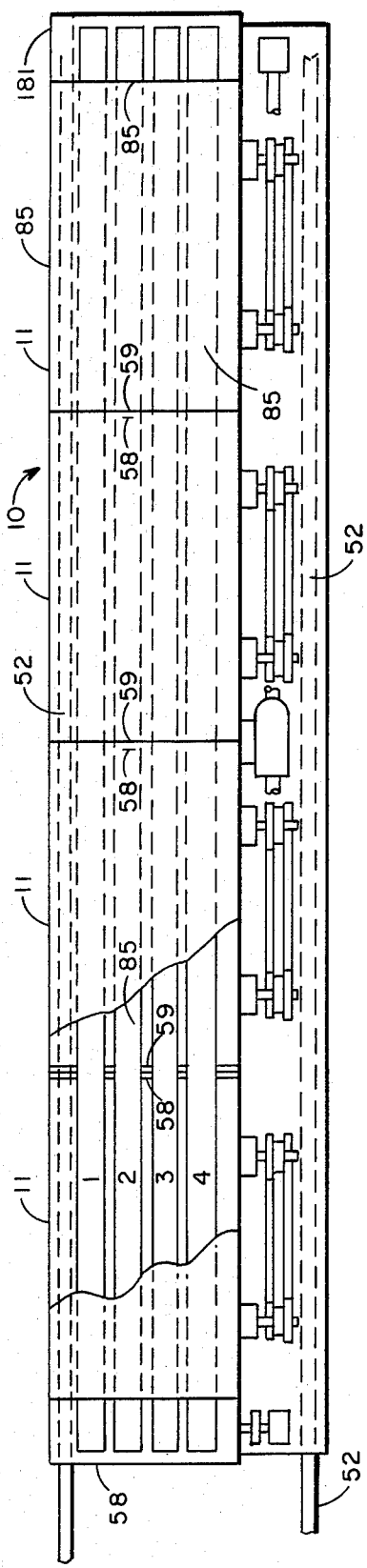
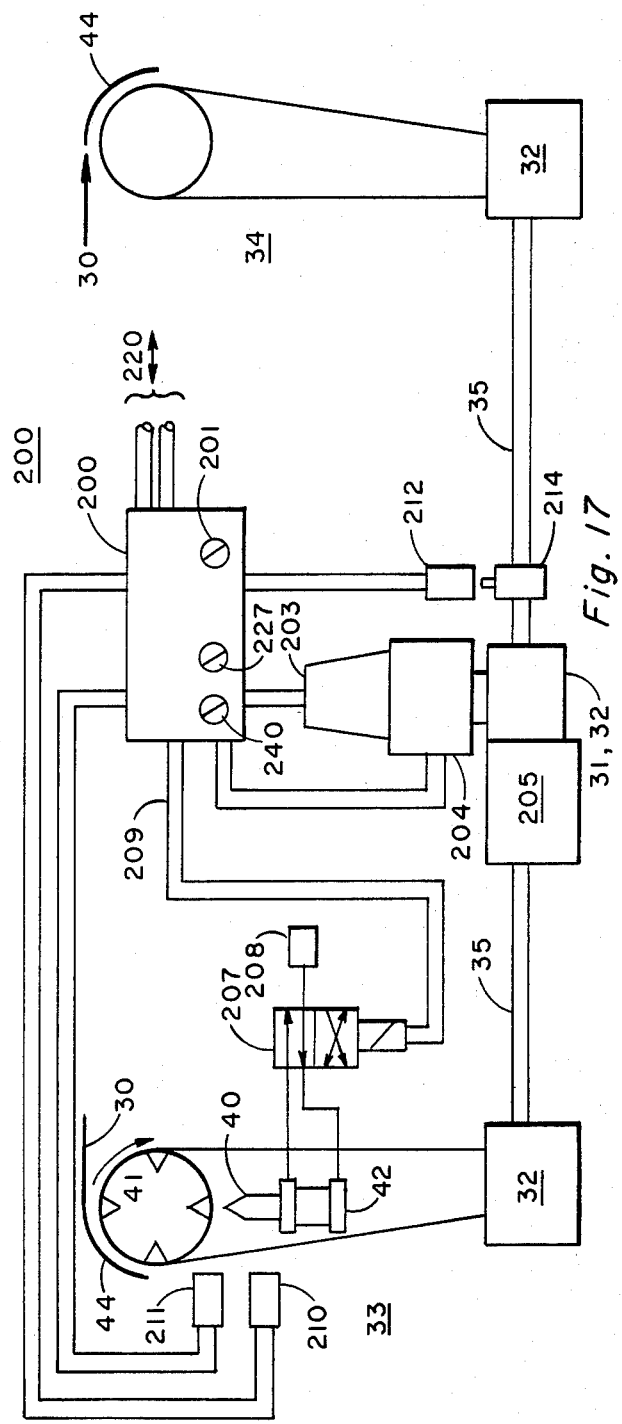

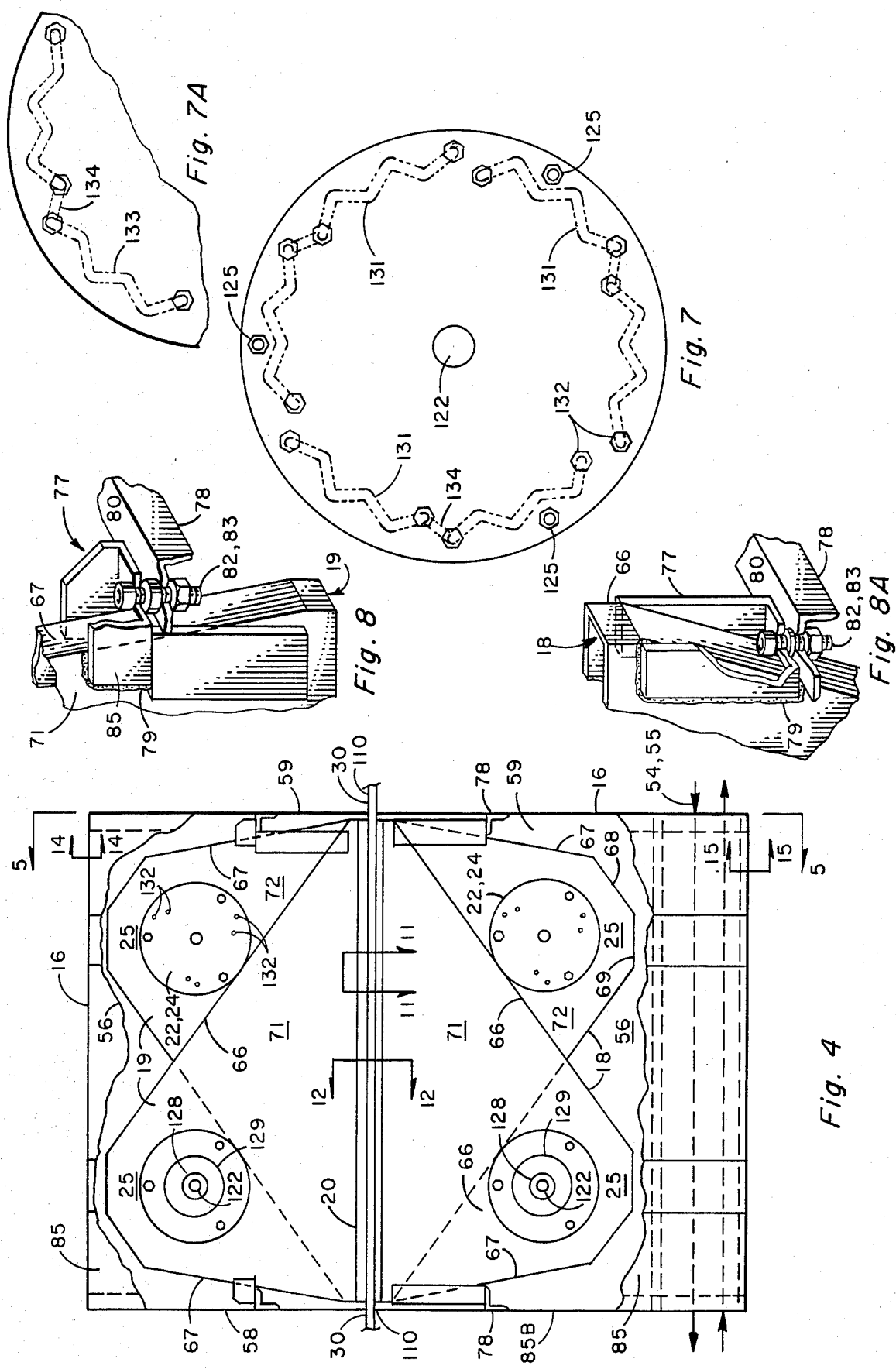

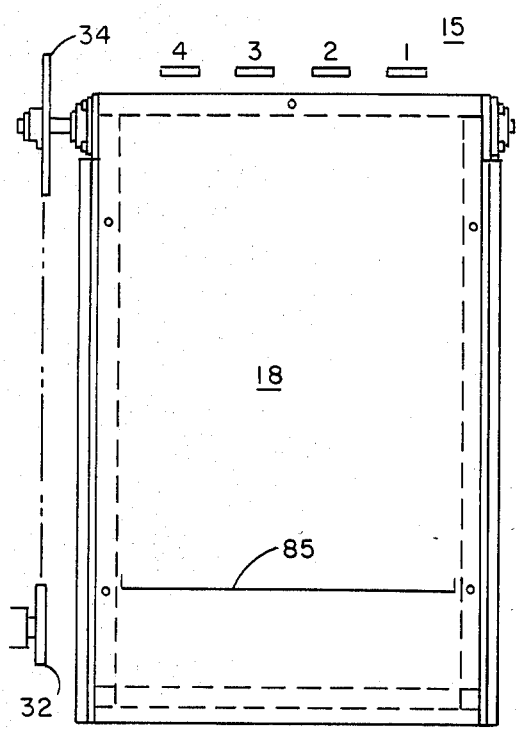
Fig. 10
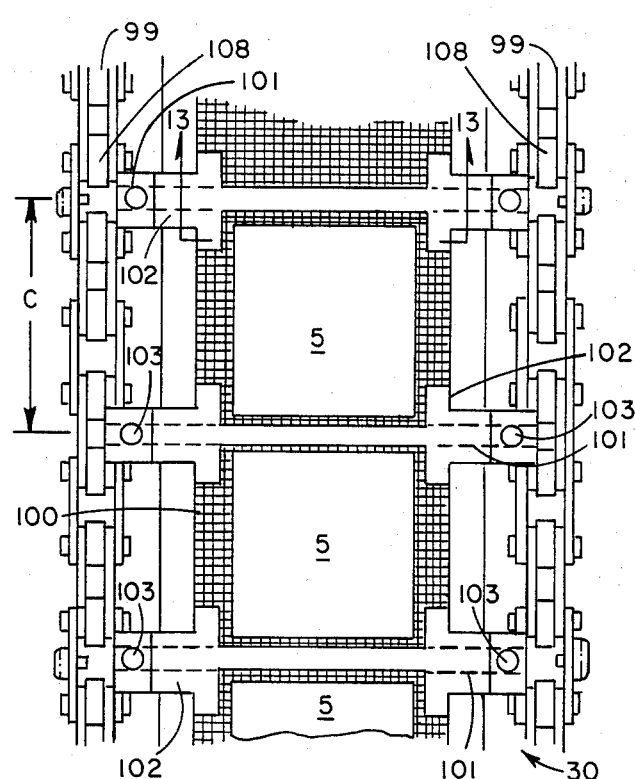
Fig. 11
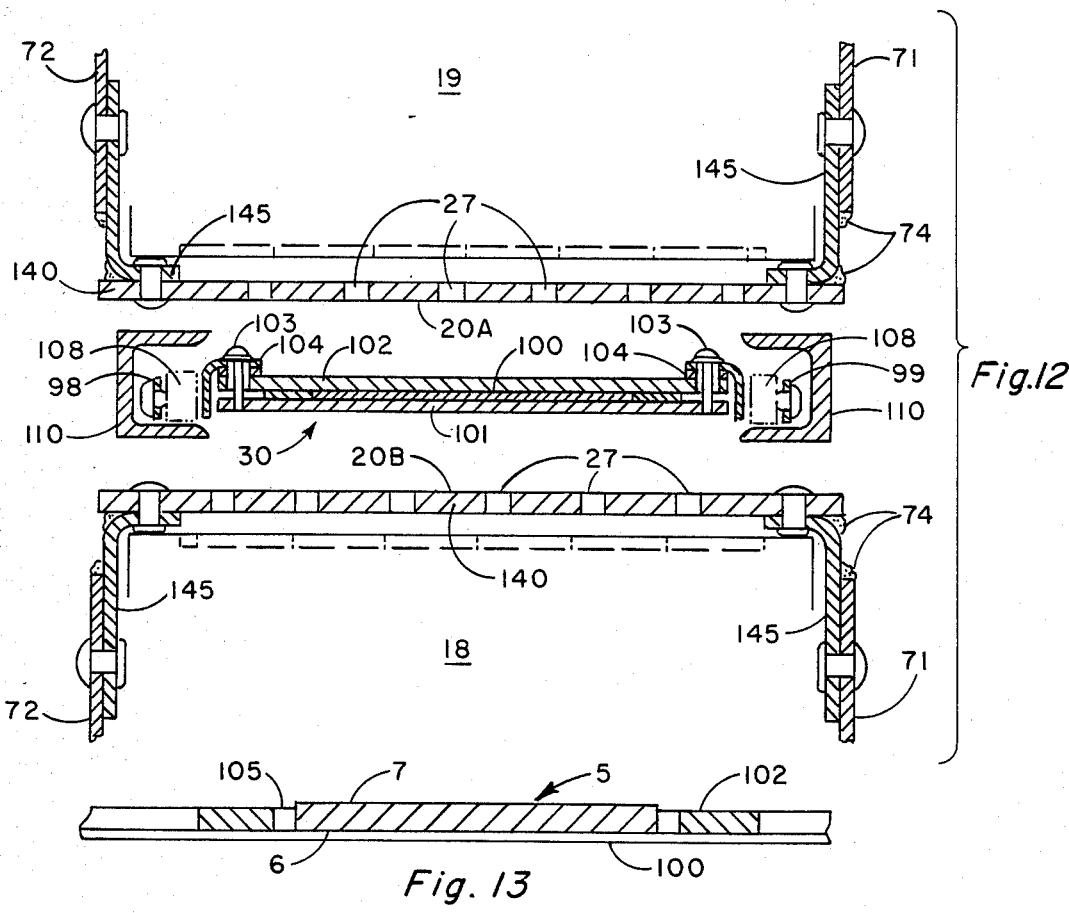
Fig. 12
Fig. 13

IMPINGEMENT OVEN AND METHOD

This invention relates to improvements in an impingement oven. One aspect is an improved impingement oven wherein heated gas, such as hot air, is directed substantially perpendicular to the top and bottom faces of a flat workpiece from one or more plenum chamber. An aspect is an impingement oven having improvements rendering it especially suitable for heating by forced convection a flat thermoplastic organic resin workpiece to a predetermined temperature range. An aspect is the provision of an impingement oven constructed and arranged from a plurality of serially arranged similarly built modules. An aspect is a module for an impingement oven. An aspect is provision of an impingement oven and/or the module from which the same is constructed suited for the heating to a biaxial orientation temperature by forced convection that directs a stream of hot air normally against a workpiece of a flat polypropylene workpiece which is to be further processed into a hollow shape in connection with which the same will be described without intending to limit the same to either the specific plastic, the end product to be made, etc.

The following references are expressly incorporated herein by reference: U.S. Pat. Nos. 4,096,953; 4,133,625; and 4,183,979.

A preferred use of the pesent invention is for heating to biaxial orientation temperature without melting any portion thereof of a flat polypropylene workpiece which is intended to be further processed into a hollow object such as a plastic tub for packaging oleo margarine, butter, cottage cheese or the like. The properties of the resin are improved by orientation of its molecules, thus rendering a stronger package having enhanced barrier properties. It is important, however, that the temperature(s) at which the package is shaped from the flat workpiece be within the predetermined orientation range. Also, the workpiece should be heated to a generally uniform temperature at which shaping commences.

The present invention has been found efficacious in heating resins for such purpose(s). A number of problems must be overcome in heating workpieces in this connection. Among them are: avoidance of melting any part of the workpiece, getting uniform heating throughout the workpiece, not overheating the corners of rectangular workpieces which might lead either to a molten condition or a nonuniform temperature, and doing so within a commercially acceptable time frame to say nothing of being theoretically acceptable on other counts. Plastics which can be handled in this manner include polypropylene, polystyrene, polyethylene terephthalate (commonly called PET) polyvinyl chloride (PVC). The workpiece may be either a monolayer of one of the foregoing materials (or other resins, too) or alternatively, may be a multilayer structure designed to achieve whatever combination of properties are demanded by the final application of the product. For example, barrier properties to control moisture, odor, taste, oxygen and carbon dioxide are designed into the end product structure and therefore demand certain laminates and resins in the workpiece.

The present invention provides an impingement oven for heating such workpieces for use, for example, in the machine described in U.S. Pat. No. 4,133,625 mentioned above. It achieves this by provision of an impingement forced convection effect to heat the workpieces—commonly called chips—to the desired temperature range. More particularly, the present invention provides an oven constructed from a series of modules wherein each module includes a housing that defines an enclosure within which takes place the heating of air (although one or more other gases could be used if a controlled atmosphere is desired) and then directing the air through a substantially closed loop cycle and against the chip(s) within the housing. To do this, there is provided within the housing enclosure a pair of plenum chambers arranged side-by-side in a compact manner. Each plenum chamber includes means for heating and circulating the air and nozzle plate means for directing the hot air substantially perpendicular to the face of a workpiece presented to it. In the preferred embodiment, the invention includes such an oven having plenum chambers as above described arranged above and below each workpiece so that streams of hot air impinge on each face of the flat workpiece and then are recirculated within the enclosure back through the heating means and circulating means.

An object of the invention is to provide an improved oven for the heating of workpieces. An object of the invention is to provide an improved impingement oven for the heating of plastic workpieces by directing streams of hot air from above and below against the respective workpieces and then recirculating the air in closed loop fashion.

Other objects, advantages, and features become apparent from a reading of the following specification in connection with the annexed drawings and claims wherein:

FIG. 3 is a top view of the oven of FIG. 2;

FIG. 4 is a side view of a module of FIGS. 2, 3 with structural support and insulation removed illustrating features of the module, workpiece (chip) conveyor, and trash conveyor;

FIG. 7 is a view of the heater assembly and baffle plate from plane 7—7 of FIG. 6 and FIG. 7A of a heater segment component of FIG. 7;

Figure 2:
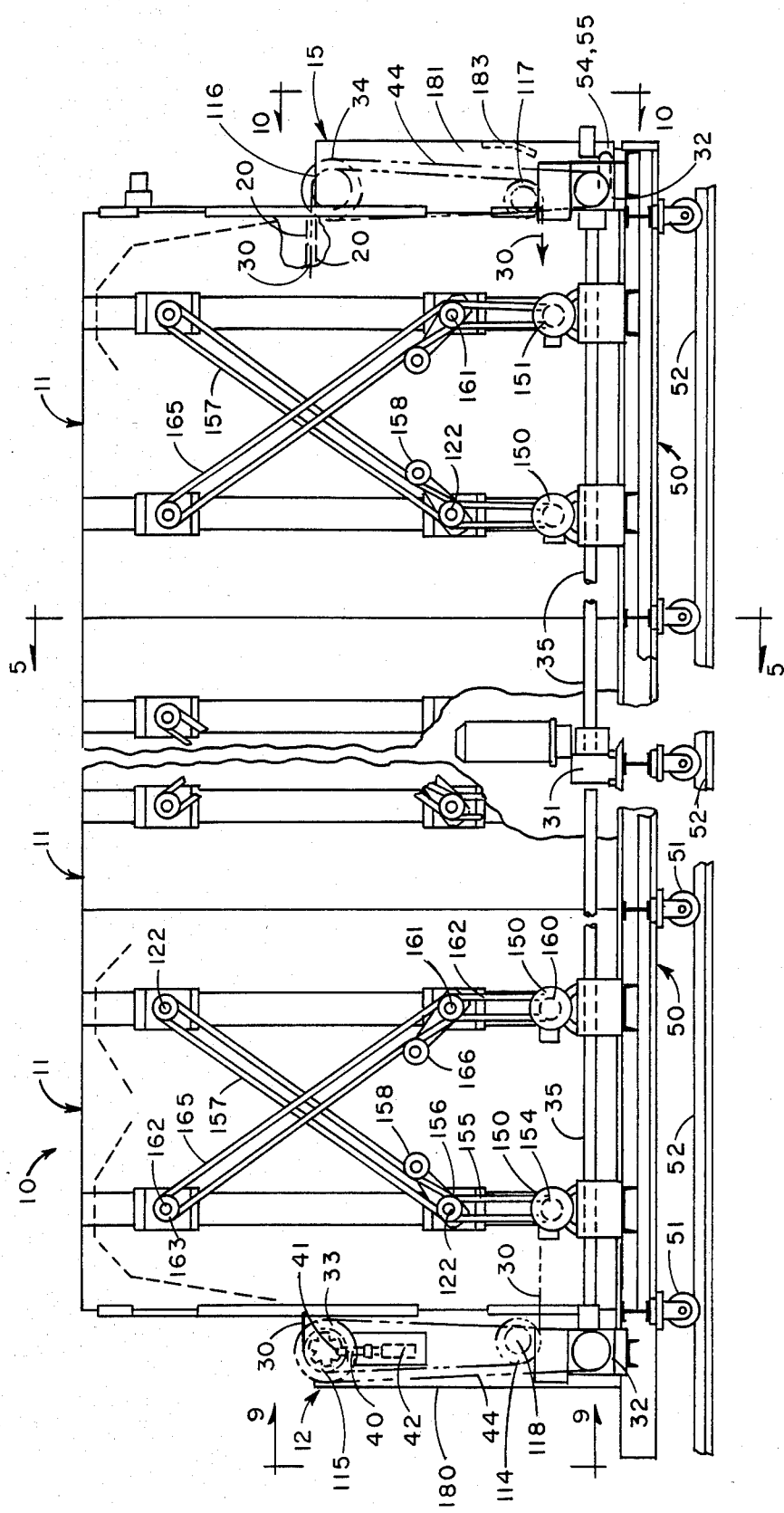
FIG. 2 is an elevation or side view of a preferred embodiment of the instant oven as constructed from preferred modules showing a carriage on which the same is mounted and illustrating drive means for operating air circulation blowers and indexing the chip conveyor.
Figure 9:
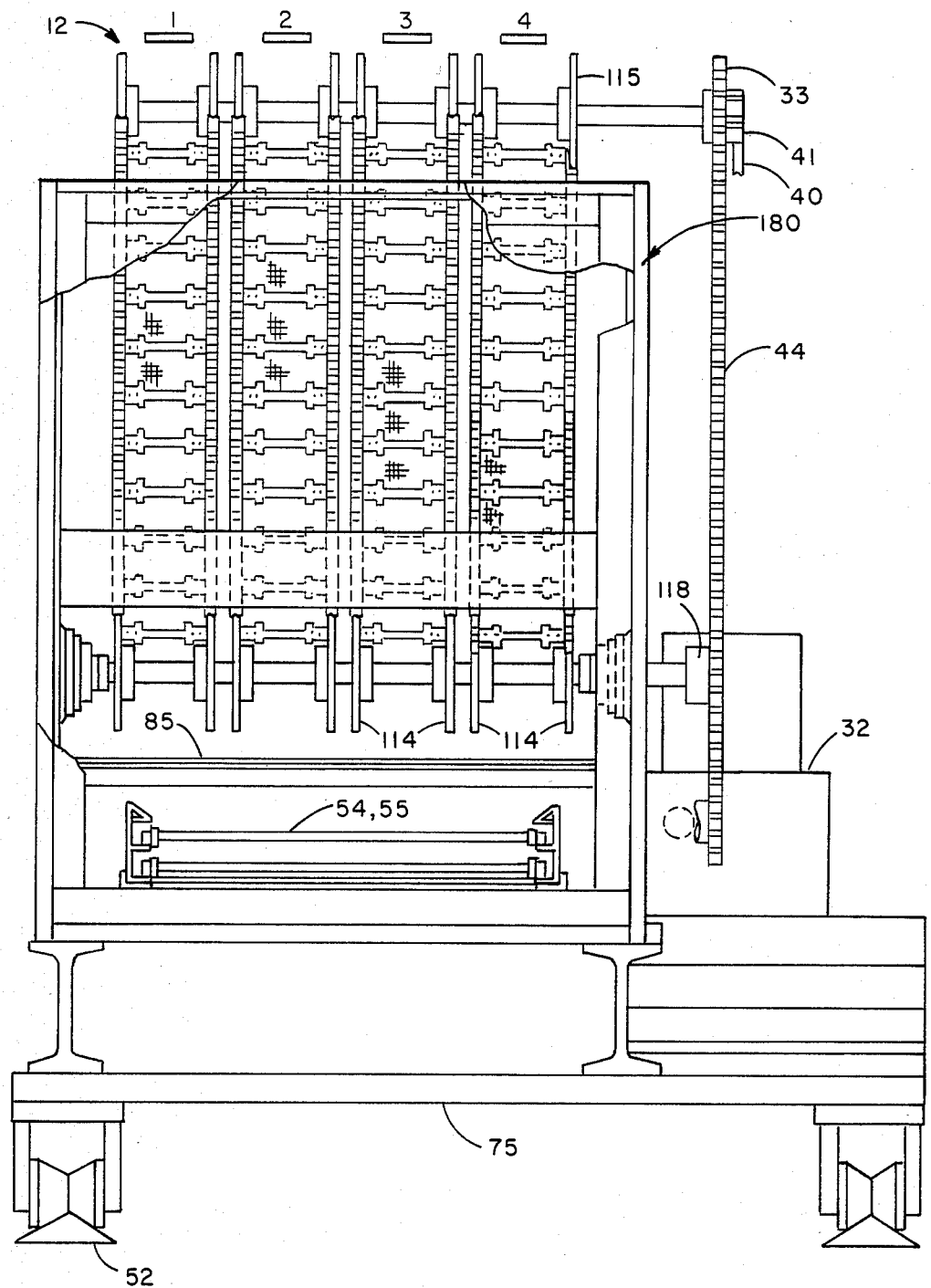
Figure 14:
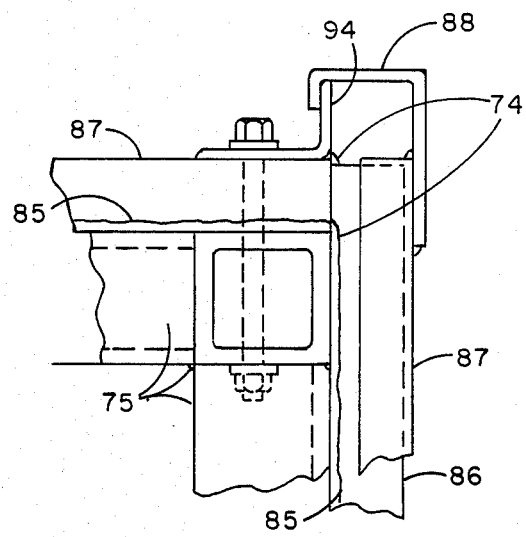
Figure 15:
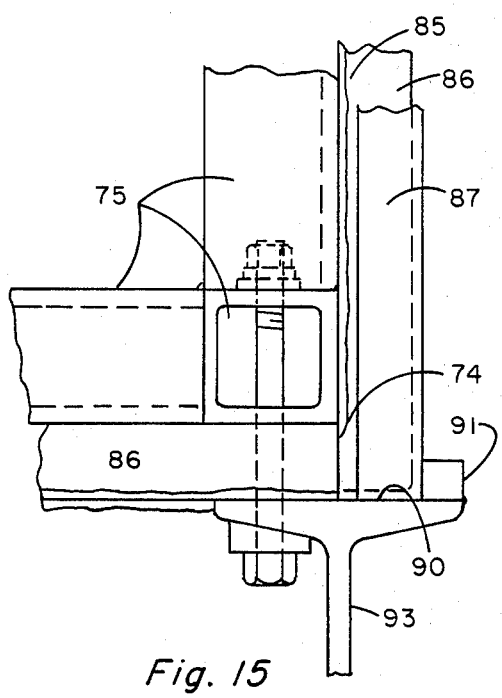
Figure 16:
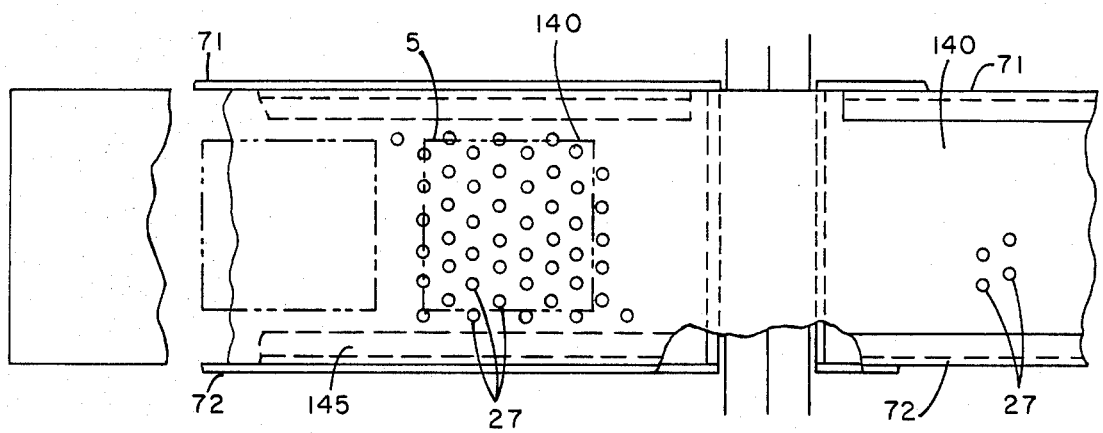
Figure 18:
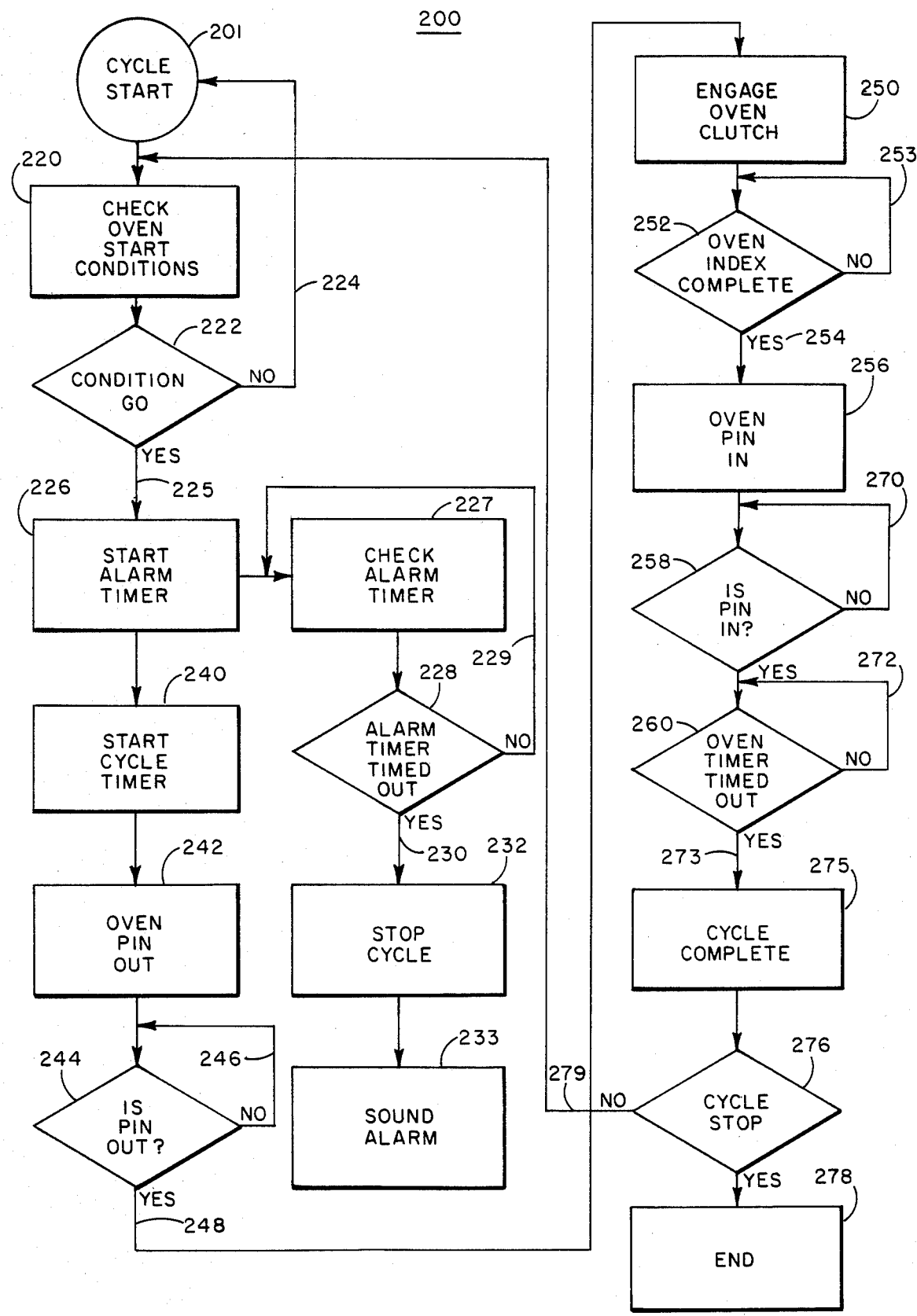

FIGS. 8 and 8A, respectively, are enlarged side views of representative upper and lower plenum vertical adjustment and support means of FIG. 4;

FIGS. 9 and 10 are partly cutaway views of end closures or cabinets for the chip conveyor as viewed along sections 9—9 and 10—10 of FIG. 2;

FIGS. 11 and 12 are respective top and cross-section views of the workpiece conveyor and its tracks as seen along sections 11—11 and 12—12 of FIG. 4; FIG. 12 also illustrates opposed nozzle plates;

FIG. 13 illustrates a preferred mode of the chip nesting in the conveyor as seen on section 13—13 of FIG. 11;

FIGS. 14 and 15, respectively, are typical sections through the frame and enclosure of the plenum chamber as shown on sections 14—14 and 15—15 of FIG. 4;

FIG. 16 shows a nozzle plate;

FIG. 17 schematically illustrates a preferred embodiment of conveyor indexing system and control; and FIG. 18 is a schematical flow chart for the control system of FIG. 17.

INTRODUCTION

Figure 1:
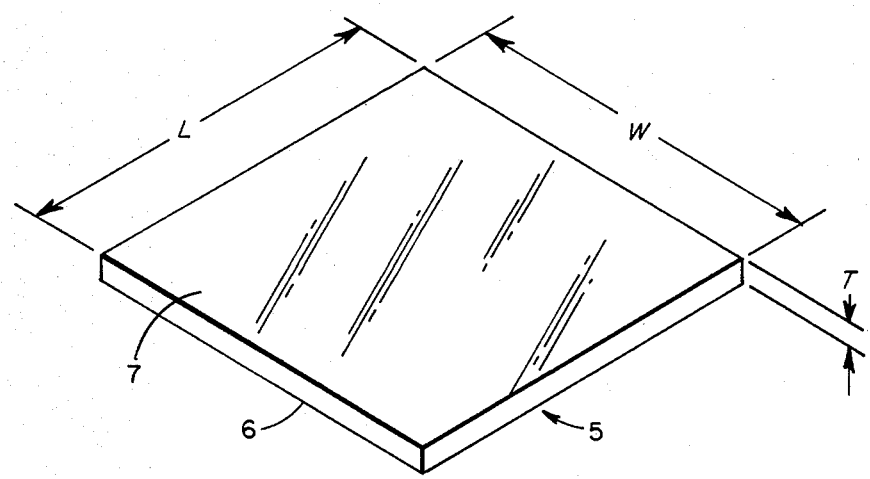
FIG. 1 illustrates a workpiece heated by the present invention by way of example but not limitation.

The present invention contemplates in its preferred construction and use that a workpiece or chip according to FIG. 1 will be processed four at a time. Such chips may be fed into the oven manually or by some suitable means which may include that described in U.S. Pat. No. 4,183,979 mentioned above. Similarly, the chips may be removed from the oven manually or by some suitable means which may include an apparatus as described in U.S. Pat. No. 4,096,953 also referenced above. And, ultimately, chips of plastic removed from the oven, as by '953, may then be processed in a forming machine such as, but not limited to, a machine as described in U.S. Pat. No. 4,133,625 which, by the way, is the preferred end use of chips heated in the instant oven.

Throughout this description, the same reference number is used to refer to the same component. Also, since each lane or plenum chamber is like the others——and so too the module—only one will be described.

Figure 5:
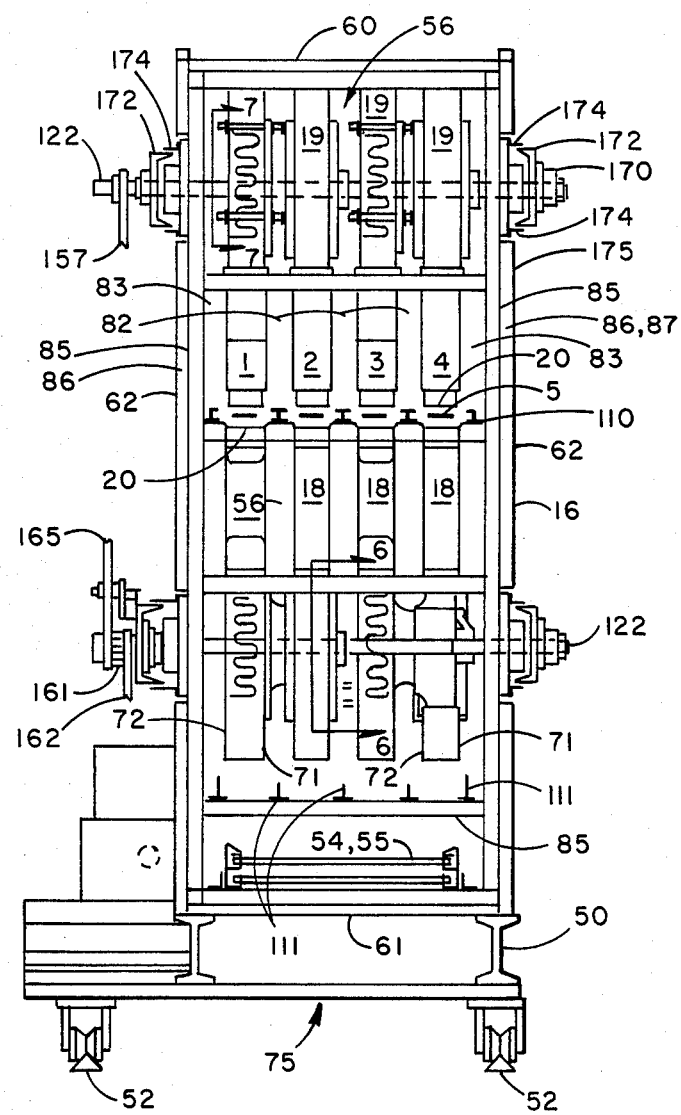
FIG. 5 is a cross-section (looking upstream) along 5—5 of FIG. 4 of one of the modules of FIG. 2 showing a four lane embodiment.

Referring to FIGS. 4,5, there is illustrated an oven and module cross-section for processing four chips at a time. The FIG. 5 embodiment thus illustrates four paths for the chips or workpieces which are respectively designated from left to right 1, 2, 3, and 4. The workpiece or chip 5 with lower face 6 and upper face 7 is thermoplastic resin and is illustrated in FIG. 1 and for purposes of further examples herein may be of monolayer polypropylene with a melt index in the range from about 0.5 to about 30 (as determined by ASTMD-1238L) having a Length, Width, and Thickness (respectively L, W, T) of 2.47 inches by 2.47 inches by 0.150 inches, respectively. Multilayer chips of the same material and dimensions composed of white-mineral-pigment-filled polypropylene outer layers of about 0.074 inches thick adhered to a middle barrier layer of either ethylene vinyl alcohol (EVAL) or Saran (polyvinylidene chloride) with an adhesive such as a polypropylene blend or an ethylene vinyl acetate glue such as duPont 3175 EVA have also been used to make a white opaque container like that illustrated in U.S. Pat. No. 3,995,763. Copolymers and other thermoplastic resins can, of course, be employed. As one can see, the preferred embodiment of chip is square as opposed to other geometric figures although it is to be understood the invention embraces treatment of chips having different thicknesses and geometric configurations (circular, hexagonal, rectangular).

GENERAL ORGANIZATION OF THE OVEN (FIGS. 1,2,3,4)

The instant oven 10 comprises a plurality of serially arranged modules 11 extending between a loading station 12 and an unloading station 15. The modules 11 are preferably all built alike, and while usually a number of them are used in series, it is possible to accomplish certain heating operations with only a single module.

Each module is tuned to provide a different temperature change as the chips are transported through them. There also are a plurality of different air pressures which will be described later in connection with operation and process conducted by the oven.

Referring to FIGS. 4 and 5 especially, each module comprises an enclosure 16 having four plenum chambers 18 arranged below a chip carrying means and four plenum chambers 19 disposed above. The respective plenum chambers 18,19 are disposed to impinge from lower and upper sources—here nozzle plates 20 which are also called 20A (for above) and 20B (for below the chip) per FIG. 12—at substantially right angles streams of hot compressed air against opposite surfaces 6,7 of the chip or workpiece presented between the nozzle plates. Each plenum chamber 18,19 has a blower 22 and heater means 24 located at the upper end 25 thereof (opposite the nozzle plate 20) to provide heated compressed air at a suitable pressure and quantity. The air, of course, emerges from the respective nozzle plate 20 which comprises the exhaust means from each plenum chamber and which directs a plurality of hot air streams against the chips from the holes or nozzles 27 (FIG. 12) therein.

The chips 5 are conveyed on a conveyor 30 which moves in an indexing fashion from left to right as seen in FIGS. 1 and 4 and normal to the paper toward the reader as seen in FIG. 5. An indexing angle type drive 31,32 is provided for this system and it causes the conveyor, hence the chips conveyed thereby, to stop at a plurality of places as they progress through the oven. The stopping is required by the mode and manner of loading and unloading. It should be understood that while the instant oven contemplates and prefers an indexing type of drive wherein the chip conveyor advances periodically (e.g. moves distance C in FIG. 11 by stop-and-go movement from load to unload end), the invention is broad enough to include a constantly moving conveyor. A group of four chips at a time, arrayed in a crossmachine rank each on its own conveyor 30, move through the oven along the respective lanes 1, 2, 3, 4 of FIG. 3.

Because it may be necessary to precisely stop and position the chips when unloaded from the oven, precise positioning control is exercised by conveyor drive system that includes indexing gear reducer transmission 31, which includes and is driven by an electrical motor. Drive 31 indexes both ends of the chip conveyor in timed and position relationship by indexing both the load end 33 and unload end 34 of the conveyor by drive shaft 35. Transmission 31 is preferably located about the middle of the oven with shaft 35 extending toward each end, as illustrated. There is a sliding fit between respective shafts 35 and driven stub shafts at angle drives 32 to permit linear movement in response to thermal expansion: splined or keyed connections, of course, establish the requisite driving relationship. A shot pin 40 and notched wheel 41 are used for additional exact positioning control of the chip conveyor belt. Double acting air cylinder 42 manipulates shot pin 40 to withdraw and advance it into the notches in the wheel 41 so that the chips can be stopped exactly where required. Appropriate pulleys and drive chains (collectively 44) connect the indexing transmission with the chip conveyor. Precise stopping location is necessary for engagement with loading means, unloading means and placement ultimately in the means for further processing.

The overall oven arrangement as shown, for example, in FIG. 2 contemplates that all of the modules 11 as well as the front and rear chip conveyor drive sections are mounted on a carriage assembly 50 which has wheels 51 that ride on rails 52. The carriage—wheels arrangement permits positioning the assembled oven relative to other equipment and also provides a means for accomodating thermal expansion and contraction of the oven during start-up and shut-down. The modules 11 comprising the oven are assembled on top of the illustrated I-beams forming the carriage and secured thereto by any suitable means such as welding, nuts-and-bolts, etc.

A trash conveyor 54,55 preferably of commercially available endless roller chain type is provided at the bottom of the oven. The commercial endless construction preferably has a roller chain around sprockets on each side, perforate metal grids or plates connected between them, and one sprocket driven from one of the angle drives.

Each module 11 comprises housing 16 that defines an enclosure 56 (FIG. 5) within which the heating operations take place and within which are mounted the various plenum chambers 18,19. The housing preferably has insulated walls although serially adjacent modules preferably do not have insulation between their adjacent or facing end walls 58,59. Enclosure top, bottom and sides 60,61,62 are insulated, however.

PLENUM CHAMBER-FIGS. 2,3,4,5,8,9,14,15

Figure 6:
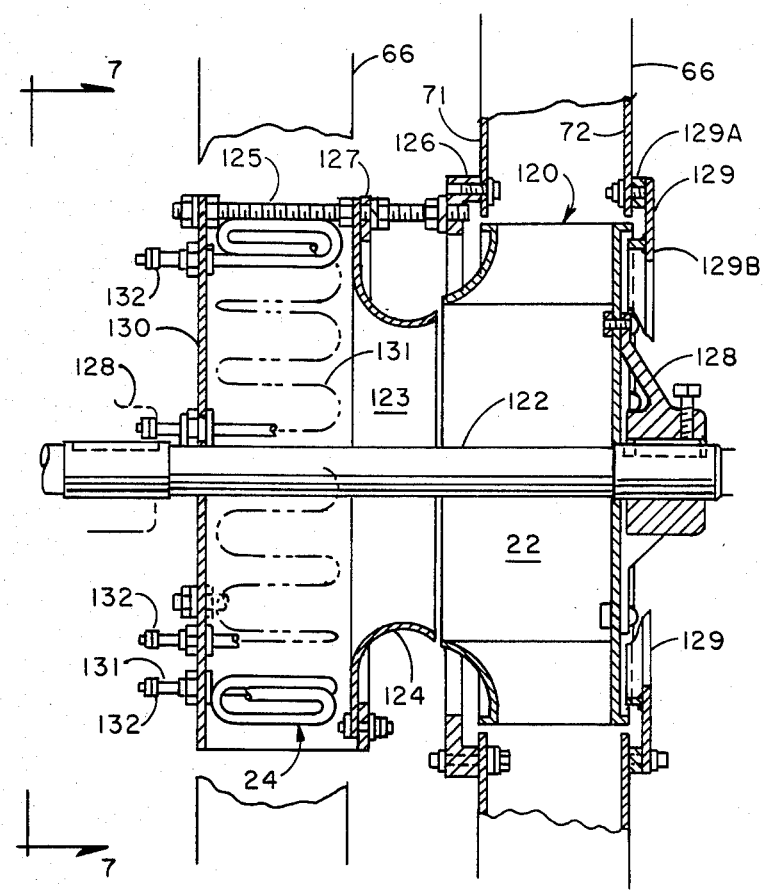
FIG. 6 is an enlarged view of the heater and blower unit as seen along 6—6 of FIG. 5.

Each plenum chamber 18,19 (for convenience, jointly and/or severally sometimes called 18) as seen from the side has a triangular or flared shape with a nozzle plate 20 along the discharge side and a heater-blower 22,24 according to FIG. 6 disposed oppositely near the top or apex 25 of the triangle. Preferably (FIGS. 4,5) each plenum has a long sloping upper wall 66, a short sloping wall 67, a plurality of short walls 68,69 or curved top wall contoured around the blower section at the apex, and a pair of side walls 71,72 connected on each side among the foregoing walls and the nozzle plate. These walls are joined in substantially an air-tight or sealed relationship. Sealant 74 suitable for the operating temperatures should be applied to the seams joining the walls: Room Temperature Vulcanizing (RTV) silicone rubber caulking such as made by General Electric Company is preferred.

The nozzle plate 20 is described below in connection with FIGS. 12 and 16.

The plenum chambers 18,19 are arranged horizontally in pairs and also above and below the chip conveyor 30—or for that matter the chips to be heated. Each plenum of each pair is end-for-end reversed to the other one to provide a way to overhang the heaters. Thus, within each module will be found horizontally four plenum chambers 19 above the chip conveying means, four plenum chambers 18 below same, and all enclosed within the insulated housing 16. As further described below in connection with the drive system, the air blowers 22 are mounted so that there are two on each blower shaft and so that plenums 18 above and below each chip 5 or in each lane 1-4 have a common drive means. It is preferred to maintain a higher pressure by higher blower rotary speed in the topmost plenum chambers, hence the upper blowers are driven faster than the plenum blowers underneath the chips.

The housing 16 surrounding each module has a load supporting frame 75 composed of conventional structural shapes such as angles, channels and so forth. As best seen in FIGS. 8,8A height adjusting means 77 are provided so that plenums can be adjustably positioned relative to the chip conveyor. Means 77 comprises a horizontal structural member 78 of angle iron of the housing frame, a cooperating horizontal support shoulder 79 extending from the plenum chamber, shims 80 selected for height adjustment therebetween, and a nut and bolt 82,83 to secure the entire assembly together.

The upper plenum chambers 19 as best seen in FIG. 8 have welded to the plenum sides 71,72 fitting blocks or tabs 85 to which the plenum chamber horizontal support surface 79 is secured or of which it is a part. Tabs and surface 85,79 may be welded together or of one piece, and further, welded to the plenum chamber.

The lower plenum chamber 18 may be similarly adjustably supported but are illustrated to have a support bracket 88 welded to a chamber wall to depend therefrom to support the plenum support surface 79 at a proper position adjacent the enclosure brace. Again, this assembly can be welded of different metallic components and welded to suitable walls or other parts of the plenum chambers.

Selection of the shim 80 thicknesses can realize the requisite height adjustment or other positioning needed for the support of the plenum chambers for proper oven operation.

MODULE 11 AND CHAMBERS 18,19 (FIGS. 2,5,14,15)

This arrangement with the offset and overhanging heaters 24 is compact, reducing the volume of each module hence the volume of air to be circulated and also providing a countercurrent heat exchange relationship between air recirculating from the nozzle 20 and chip 5 region to the heaters 24 through space(s) 82,83 between plenum walls and/or the enclosure sheaths 58,59,85 as the case may be.

The module walls (e.g. FIGS. 14,15) are preferably made with sheathing 85 secured completely about each module leaving only horizontal slots at the ends for the chip conveyor 30 and trash conveyor 54,55. The sheathing is preferably of sheet metal tack welded or pop riveted to frame members and sealed along all seams with high temperature caulking 74. Even the ends between adjacent modules are sheathed.

The top, bottom and side walls of each module are also insulated preferably with a rigid insulation 86 such as, but not limited to, a ceramic foam, preferably CERA brand form board type 126 made by Johns-Manville.

An outer sheathing 87 may be provided to protect the insulation against mechanical damage.

FIGS. 14,15 also show one manner of attaching insulation and outer sheathing to a module or, as illustrated in FIG. 2, to an assembled oven. Entire sheathed insulation panels 86,87 are made up, the top of each having a hanging channel 88 and the bottom to fit within recess 90 between toe bar 91 and inner sheathing 85 on top of the base channel 93 of carriage 50. Hanging channel 88 engages a top anchor angle 94. Such panels may cover more than one module, but preferably they extend over only one as per FIG. 2. However, similarly structured walls may be fastened to the frame members over inner sheathing 85 by stud bolts or other suitable means.

Preferably insulation and outer sheathing is applied after the modules 11 or their frames are lined up along the carriage 50. Inner sheathing 85 is preferably applied to individual modules but may be applied to form an integral skin on the entire oven.

CHIP CONVEYOR (FIGS. 2,5,11,12,13)

The chip conveyor 30 provides a pocket into which each chip 5 is dropped by the person doing the loading or the loading machine. This facilitates keeping the chip exactly in place where it has be not only for heating but for further downstream manipulation and processing.

Conveyor 30 comprises a pair of roller chains 98,99 mounted on each side and between which is suspended a belt assembly on which the chip rests. This belt has a fiber glass mesh belt 100 on which the chip rests, a crossbar 101 on the bottom of the mesh, and an I-shaped bar 102 on top of the mesh and clamped by a fastener such as a bolt 103 that threadably engages a tapped hole in crossbar 101, to secure the mesh-and-bar assembly to the conveyor lugs 104. I-bars 102 also extend across the mesh to define a pocket 105 between each two of them in which the chip nestles while resting on the mesh. The pair of roller chains are commercially available with inward facing lugs 104 to which the tie bars are secured by rivets or bolts.

The weight of the chain requires the rollers 108 thereof move along horizontal tracks 110 which latter are secured to and part of the enclosure structure. The horizontal tracks 110 are preferably formed from a channel section with the open side facing inwardly of each vertical pair of plenums to provide approximately equal area and resistance to return air flow past the roller chain back to the heaters. A similar arrangement of horizontal channel (FIG. 5) tracks 111 is provided for the return course of the chip conveyor that travels along the bottom part of each enclosure. Please note that usually each module comprises a grouping of plenums with overhanging heater-blower. When the modules themselves are arranged serially, then the requisite chip conveyor, trash belt and end closures are provided.

The chip conveyor basically moves in endless belt fashion around a substantially rectangular path comprising upper and lower horizontal track 110,111 upper and lower sprockets 114,115,116,117 located in the load and unload cabinet so that the conveyor itself is exposed sufficiently for loading and unloading but to minimize air leakage and heat loss. The chip conveyor drive shaft and shot pin 33,40,42 have already been described.

HEATER-BLOWER (FIGS. 4,5,6,7,7A)

Each plenum chamber has a heater 24 and blower 22 combination disposed at its upper or apex end. The blower wheel 120 is disposed within the apex 25 of the plenum and supported on its drive shaft 122. The entrance 123 to the blower is defined by an inlet nozzle 124 supported from one side wall 71 or 72, as the case may be of the plenum chamber by a plurality of stud bolts 125 that in turn extend in cantilever fashion from a stud support ring 126 mounted on the wall of the plenum chamber. Shroud nozzle stiffening ring 127 is fastened about the perimeter of the shroud ring where it engages the studs 125. Hub 128 supports impeller 120 from a location on the shaft 122 opposite entrance 123. Rear shroud ring 129 with a spacer 129A and labyrinth ring 129B straddle the impeller rim on the backside of the wheel 120. A conventional set screw and key arrangement connect the hub to the shaft.

This entrance assembly further includes imperforate entrance or baffle plate 130 supported on the studs, three electrical heating assembly segments 131 supported on baffle 130 for convection heating air passed thereover, as well as the imperforate inlet nozzle 124 which cooperates in the usual manner with the blower wheel or impeller by smoothly directing air thereinto. Each module has four blower shafts 122 each of which drives two blowers.

It is important to notice that air is heated on the inlet of the blower by being drawn in through an inlet having the shape of a cylindrical surface as described by segments 131 which provide in their most preferred embodiments a plurality of cylindrical heater means disposed substantially normally across the air flow and upstream of the blower inlet nozzle.

It is preferred to use a backward inclined blower impeller 120 rotated in a direction to discharge the air therefrom tangentially along the long, shallow sloped side 66 of the plenum.

The electrical heater segments 131 (FIG. 7A) extend over a 120° angular arc and preferably are formed in a sinusoidal shape about a cylindrical surface from commercially available sheathed resistance heating elements (similar to those on an electrical cooking range), which in turn are of circular cross-section. One preferred embodiment is a Wattrod heating element made by Watlow Manufacturing Company. Most preferably, each segment 131 locates a substantially straight part of the element in the cylindrical surface and coaxial with the blower shaft, albeit connected at the ends to form an approximate sine wave. Short individual elements 133 (FIG. 7A) can be joined by a jumper 134 to form segments 131. Terminal connections 132 for the heaters extend through the plate 130, providing the electrical and mechanical connection to the plate.

It is important that heater 24 be built in plural segments (three are preferred) so that each can be individually removed for repair or service without the need for pulling the blower shaft 122 which occur if the heater were circular and surrounding the shaft. A conventional heater circuit connecting the heaters 131 in electrical parallel and with conventional thermostatic controls is provided and each individual lane in each plenum is tuned to provide the proper heating effect on the chips passing thereby.

Note again that the heater portion 24 protrudes from one wall 71 or 72 of its associated plenum chamber 18,19 and overhangs the other plenum chamber which is paired with it. This is illustrated in FIGS. 2, 4, and 6. This overhang feature permits a compact arrangement, reducing the floor space required by the oven and also reducing the volume of the chamber enclosed by each module. The reduction in volume, of course, reduces the amount of air that has to be heated and handled.

NOZZLE PLATE 20 (FIGS. 12,16)

Nozzle plate 20 comprises one side of each plenum chamber. It is the side that exhausts streams of heated air against the chips to be heated. The chip conveyor 30 and for that matter chips on them pass between opposed pairs of nozzle plates best seen in FIG. 12.

The plenum chambers are preferably made of metal and so are the nozzle plates. Each nozzle plate 20 (in FIG. 12, 20A and 20B) comprises a substantially flat or plate-like member 140 through which are multiple perforations 27. These perforations each form a small nozzle or orifice plate. They are much to be preferred to so-called slot structures because more uniform heating on the relatively small body of a chip can be obtained with a plurality of openings through which the hot air emerges. A slot plate would not provide the uniformity of heat coverage and might provoke hot spots in the chip leading either to melting, nonuniform heating, or other undesired consequences.

Each nozzle plate is secured on the side of the plenum chamber opposite the blower 24 or opposite the apex 25. It is positioned so that the nozzles 27 can direct streams of air substantially normal to whatever chip or workpiece is positioned for heating.

As already mentioned, each nozzle plate is a perforated member. It is preferred that the plate be ⅛th inch thick, the holes be circular of ⅛th inch diameter, and that they be spaced from ⅜ths to ½ inch from a 60° or hexagonal pattern. Each nozzle plate should be spaced between one and four holes diameters—about ½ inch preferably—from the surface of the chip to be heated.

The plate comprising each nozzle plate is secured as by tack weld or pop rivets along its side of the oven to an angle 145 which is in turn secured to the inside of the plenum chamber wall 71,72. In the most preferred embodiment, caulking 74 of room temperature vulcanizing (RTV) silicon rubber of any commercially available type is used to seal the joints between the plates the angle iron and wall. This not only minimizes leakage, but it eliminates a possible slot effect from the leakage which would be undesired for reasons mentioned above.

BLOWER DRIVE SYSTEM (FIGS. 2,3,4,5)

Referring especially to FIGS. 2 and 4, a pair of electric motors 150,151 is provided to each module for driving the blower wheels therein. Each electric motor drives a pair of blower shafts 122 and each shaft has a pair of blower wheels 120 mounted on it in the manner described with reference to FIG. 6 above.

One electric motor on each module drives its system in clockwise fashion while the other electric motor drives its system in counterclockwise fashion. Conventional belt and pulley arrangements are used for power transmission from each motor and so arranged by selecting the size of the pulley that the blowers for plenums on top of each chip run faster and therefore provide more air delivery and higher pressure than do the plenums underneath wherein the blowers run at a slower rotational speed (assuming, that is, that all the blowers are constructed alike which in this instance they are). The pulleys for the blower drives above the chip conveyor thus have smaller diameters than those below.

Referring to the counterclockwise drive system for the most left-hand modules of FIGS. 2, 4. This comprises electric motor 150, a drive pulley 154 mounted on the output shaft of the motor, a drive belt 155, and a master driven pulley 156 on the first plenum blower shaft. We term the master pulley 156 such because it in turn drives both shaft 122 on which it is mounted and upper plenum blower shaft 122 via belt 157. A timing belt of well-known and commercially available structure is preferably used in all instances. A belt tensioning device 158 is also provided.

Clockwise rotation is realized by a similar arrangement using the second electric motor 151, its output pulley 160 and master pulley 161 connected by belt 162, and an upper plenum blower drive pulley 163 mounted on the blower wheel shaft 122 and driven by belt 165 from the second master pulley. A belt tensioning device 166 is likewise used.

In FIG. 5,6 there is illustrated the cross machine blower drive configuration. Each blower shaft 122 supports two blower impellers 120 arranged in alternate lanes. In the section seen in FIG. 5, the shafts 122 support impellers in lanes 2 and 4 in both the upper and lower plenum chambers. The remining drive shafts support blower wheels in lanes 1 and 3 in both the upper and lower courses of plenum chambers. Upper and lower impellers for each lane are driven in opposite directions.

This configuration of drive means is realized because of the off-set arrangement of the plenum chambers, heaters, and blowers. It permits driving the respective impellers in the most efficient direction for exhausting air against the desired side of the plenum chamber and otherwise delivering the quantity and pressure of air desired. By driving the blower wheels in the directions indicated, the most effective fluid flow is also realized with minimum short circuits and so forth among the plenum chambers and the blowers themselves.

FIGS. 4 and 5 also illustrate shaft bearings for revolvably supporting the plenum wheel shafts and respective support means for in turn receiving and supporting said bearings. These support means of course, are supported for load bearing purposes from suitable members of the structure defining the module or oven housing within which the various plenum chambers, etc. are enclosed. As shown, this includes bearing 170 (or a pillow-block) attached to a section of channel iron 172 supported from angle irons 174 in turn attached preferably by bolts to each flange 172 thereof and which in turn are attached by a plurality of bolts to a vertically extending part of the housing 175. There are two channels on each side of the module housing and a number of structural members preferably angle iron or squares extend horizontally to the end members of the respective module. The two sides defined by the lower bearing supports, etc. just described are connected by a plurality of horizontal structural members as generally illustrated in FIG. 5.

OVEN END CABINETS FIGS. 2,9,10

At the end of the oven are loading and unloading cabinets 180,181 respectively which support the sprockets 114 . . . 117, their shafts, bearings, etc. for the chip conveyor(s) 30, provide access to the top of conveyor 30 for loading at 12 and unloading at 15 chips 5, and similarly for the trash conveyor 54,55. Note, however, the trash conveyor receives trash at unload cabinet 181 when things fall off the conveyor 30 there and are directed by chute 183 (FIG. 2) to the top of the trash belt. The trash belt runs continuously, thus continuously to bring material into the bottom of cabinet 180 where it is dumped as the belt trash conveyor goes around on its sprocket and endlessly returns to the cabinet 181.

The modules are sheathed and sealed at their ends except for slots to pass the chip and trash conveyors 30,54,55. The end cabinets provide an added resistance to loss of heated air (or other medium) in addition to that of the oven modules.

OPERATION

The machine is started up by turning on the electric motors 30,150,151 driving the various blowers and conveyors. Means for loading and unloading are started at this time and time for placing chips 5 in the pockets 105 on the chip conveyor 30 and removing same therefrom respectively: Means as described in Letters Patents referenced above can be used or, alternatively, manual placement and removal of chips can be done.

The electrical heaters 24,131 are also all turned on and the system is allowed to operate until it is brought up to the desired operating temperature and steady state heating conditions are realized. At that point in time, chips are placed by lateral groups of four chips in the chip conveyor pockets 105. Assuming that all four lanes 1, 2, 3, 4 are being used, four chips are placed in the conveyor pockets at one end and at the same time heated chips are removed at the other end for further processing. During the time of loading and unloading chips, the indexing drive 31 holds the chip conveyor stationary, with no advancement of the chips from the loading end to the unloading end. At the end of the requisite dwell time for loading and unloading, the operator or a conventional control valve responding to the chip conveyor drive 31 unlocks the shot pin 40 at the left end of the oven and the entire chip conveyor 30 advances one space C (FIG. 11). In the preferred embodiment, an oven four modules long has 390 heating stations at which the chips stop in order to be heated from room temperature (about 68° F.) to biaxial orientation temperature (about 330° F.).

While the chips are at each station they are positioned between the nozzle plates 20A,20B (FIG. 12) of the upper and lower courses of plenum chambers 18,19. Streams of hot air emerge from the individual nozzles or holes 27 in the nozzle plates and impinge substantially normally upon the upper 7 and lower 6 surfaces of the chip. The fiberglass mesh 100 (about five to the inch) of the chip conveyor permits access and impingement of the air from underneath against the lower face of the chip.

Referring for a moment to FIGS. 5 and 12, the air flows in somewhat turbulent fashion horizontally across the face of the chip and towards the return spacing 82,83 respectively defined between adjacent sidewalls of adjacent plenums or between outer plenum walls and the housing walls. The air flows up through such return spaces and past the electrical heaters 24 at the entrance to the several blower assemblies 22. Air, by this time, has been reheated by convection type contact with the electrical heater 131 and is impelled by the blower wheel 120 into the plenum chamber arrayed in pressure sufficient to accomplish the desired heating.

As already mentioned, the process goes on until the chip 5 emerges—usually in a cross-machine group of four—at the unload end of the oven at which point either manual or automatic means are used to unload same.

It is preferred to provide in most cases greater air pressure above the respective chips than below to keep them from flying out of the conveyor belt pockets. It is also preferred to provide a temperature gradient along the oven. Typical pressure gradients in a four module long oven using the clockwise-counterclockwise rotations illustrated in FIG. 2 and blower wheels with backward inclined vanes and of an OD of twelve inches are (read as Revolutions per Minute):

| Station | Nearest Load 12 | Second Module | Third Module | Exit Module Unload 15 |
| --- | --- | --- | --- | --- |
| TOP (RPM) | 3000+ | 2544 | 2962 | 2730 |
| BOTTOM (RPM) | 3000+ | 2544 | 2544 | 2544 |

Under the same or similar operating conditions polypropylene chips as described above are heated to a biaxial orientation temperature in the range from about 323° F. to about 328° F.

Thus, a process for heating plastic chips of thermoplastic resin can be practiced by this invention by passing the chips or workpieces through at least one but preferably a plurality of similarly constructed modules 11—preferably identically constructed within the limit of manufacturing capability—which provide upper and lower plenum chambers 18,19 with nozzle plates 20A,20B facing each other and a chip conveyor having pockets 105 between the nozzle plates for conveying such chips, establishing a pressure gradient or air flow that is greater above each chip than below, using a nozzle plate instead of slots to direct perpendicularly air against the chips, and advancing the chips on a perforate belt 100 within the pocket thereon from one end of the oven 12 to the other 15. Preferably, the advancing is carried out by periodic stopping of the chip at heating stations and then advancing same by distance C (FIG. 11) to the next station. The entire procedure is carried out within an enclosure or housing 16 that surrounds the plenum chambers, heating means 24, and air moving or compressing means 22, 120.

The particular thing to be heated, e.g. size, mass, resin, and other factors determine overall structural and parametric conditions e.g. number of modules; temperatures; size of heaters; blowers; conveyors for chips and trash, etc. The shape and configuration of nozzles and their spacing from the chip and each other may also be varied.

INDEXING SYSTEM OF FIGS. 2, 17, AND 18

The simplest way to achieve indexing drive here is to buy a commercially available indexing gearbox and drive it from the electric motor as part of the indexing system 31,32 of FIG. 2. In such case, the motor runs continuously and the gearbox mechanically provides a periodic motion sufficient to advance chip conveyor 30 the required amount, the gearbox also providing the requisite dwell period of time so that chips are heated properly at each dwell station in the oven. However, certain failsafe features may want to be incorporated to prevent indexing or to stop in case of malfunctions. Further, it may be desirable to provide some way to adjust dwell time during which the chip conveyor 30 stays in one position. The system of FIGS. 2, 17 and 18 illustrate a preferred manner of accomplishing these things by using an electric clutch to connect and disconnect the drive motor with the rest of the system and using timers to shut down if events do not occur within a preselected time interval.

Referring to FIG. 17, there is shown a programmable controller 200 having a start button 201, an electric motor 203 (which is part of the indexing angle drive earlier called 31,32), an electric clutch-brake combination 204 driven by the motor and located between it and the gear reduction and indexing drive 205. The system also includes the double acting air cylinder 42 to which air is controllably admitted by the control valve 207 from a source 208. The programmable controller 200 upon receiving information responds and sends signals to control valve 207 through wires or other suitable communication channel 209 thereby to selectively position the shot pin 40 in a notch of the shot wheel 41 or to withdraw it therefrom, as the case may be.

As previously noted, the shot wheel 41 is mounted on the same shaft with the sprockets 44 which drive the chip conveyors 30 with drive belts and pulleys connecting the gear boxes 32 to the drive shafts on which the sprockets 44 are located.

Three proximity switches provide a variety of signals to the programmable controller 200. Switches 210 and 211 respectively sense the position of shot pin 40 as being out of the shot hole (i.e. in the withdrawn position illustrated in FIG. 17 or inserted in the shot hole (as illustrated in FIG. 2 and dotted lines FIG. 17). Proximity switch 212 senses the position of a rotating flag 214 on shaft 35 to advise the controller 200 that an index is complete. This permits controller 200 to operate clutch 204 to disconnect motor 203 from driving indexer 205, drive shafts 35, etc.

FIG. 18 illustrates the flow diagram for controlling as summarized above. Button 200 is pushed to start the cycle whereupon the controller, as an optional but illustrated first process step 220, interrogates not only the oven but adjacent equipment to see if all the conditions for initiating an indexing cycle are present. The variety of these conditions, especially since most are external to the oven here in question, are beyond the scope of this invention hence are not displayed but are shown as a desirable optional first step. One of the simplest interrogations is determine if all the electric motors, including those of the blower motors as well as indexing motor 203, are connected and operating. This preferably is done internally of the control circuitry.

Condition go decision step 222 receives signals from oven start and determines if conditions permit going on to the next proces step 226 which is that of starting an alarm timer. So long as oven start conditions are not satisfied the condition go answer no 224 returns the system to cycle start. However, when condition go response is yes 225, the alarm timer start routine 226 occurs. This involves, check alarm timer process step, process and decision steps 227,228 if the start of the alarm timer is timed out which if not 229 returns the routine to the check alarm 227 for another iteration. However, once the alarm timer check 227 reports yes 230 as being timed out, process step stop cycle 232 is initiated to stop the entire index cycle by shutting off all power (to motors 150,151,203 for instance) and to sound an alarm 233. It should now be apparent that the purpose of including alarm timer routine 227-233 is to shut down the system and turn on an alarm if indexing is not completed within a preselected certain time interval as determined by the alarm timer.

FIG. 17 schematically shows timer preselection means 227,240 (same as step numbers for convenience) to set the timers.

At the same time the alarm timer 226 initiates its routine 227-233, cycle timer start process 240 is initiated whereby controller 200 withdraws pin 40 from the notch in wheel 41 which it has been residing. This is done by the controller sending appropriate signals over channel 209 to the control valve 207 and operating the double acting air cylinder 42 in a well-known manner to withdraw pin 40 from notch 41.

At this point a fail-safe decision process 242 through 250 takes place serially after the start of the cycle timer to check on whether or not the shot pin 40 is really out, which is detected by the pair of proximity switches 210 and 211 which together report, respectively, the absence of the shot pin in the wheel notch by switch 210 and the presence of the shot pin in the wheel notch via switch 211. This determination is identified as pin-out decision step 244 which if no 246 iterates and prevents advance to the next step 250 until the situation corrects or alarm timer 228 times out and shuts down. In event of no malfunction, the pin-out decision 244 reports yet 248 and goes to the process step 250 to engage oven clutch 204 of FIG. 17. Keep in mind this is done while electric motor 203 is operating so that engagement of clutch 204 drives the indexing angle gear box 205 preferably through exactly one revolution. Proximity switch 212 by reading the position of flag 214 on the drive shaft 35 reports the event of one rotation to controller 200 which then disengages the clutch 204 and stops rotation of shaft 35, hence clip conveyor advance for a time interval equal to the desired conveyor dwell.

The oven index complete decision 252 continues to report no as long as proximity switch 212 does not read flag 214 as having completed one complete rotation. Of course, a counting means could be provided to permit additional rotations as a less preferred embodiment. As long as oven index complete reports no 253, the connection or engagement of clutch 204 continues. However, the clutch is again disengaged and the motor stops driving the index box when index complete answers yes 254 in response to a signal sent to the controller 200 by the switch 212.

Stopping the conveyor advance also requires its precise positioning by moving shaft pin 40 into the notch on wheel 41. Note that four notches are provided, indicating a 4:1 reduction between gearbox 205 and wheel 41 in the illustrated system. Controller 200 now fires cylinder 42 and drives shot pin 40 into whatever notch is presented at process step 256. Then decision step 258 determines if oven pin 40 has been able to drive all the way into its notch. If it has not—step 270—some fault has prevented a complete index whereupon the cycle and alarm timers 240,227 will both continue to run while nothing else happens with the result that the alarm timer through its routine 227-233 will as a matter of course stop cycle 232 and sound an alarm 233.

Ordinarily, however, the oven pin 40 drives into the notch in the wheel 41 to yield from switch 21) decision yes 273, then to decision step oven timer time out 260. If decision 260 is yes, meaning the cycle is complete, the system goes serially to process step cycle complete 275 and decision cycle stop 276 which either shuts off everything 278 or repeats the entire process 279. Shut off 278 assures completing before shutting down even if on manual shut down.

Returning to the case where pin 40 is reported as not in, 270, nothing is permitted to happen until the alarm timer 226 has timed out 230,232. Once, however, pin 40 is reported as in it next goes to decision step 260, explained above. If it answers no 272, it holds everything at that point just ahead of the cycle complete report 275 and the alarm timer eventually steps the cycle 232.

What is claimed is:

1. An impingement oven module for heating a generally planar workpiece of resin by directing a flow of heated fluid substantially normally against at least one surface of the workpiece comprising
   a housing defining an enclosure within which occur heating and heated gaseous fluid flow and having side, bottom, top and end walls and within said enclosure
   a pair of plenum chambers arranged side-by-side
      each plenum chamber having an elongated nozzle plate and a plurality of plenum walls defining said plenum, said nozzle plate being means for defining a perforate one of said plenum walls and for exhausting heated fluid against a workpiece, gaseous pump impeller means within the walls of said plenum for removing fluid from within said enclosure and discharging fluid within the plenum for exhaust through said nozzle plate, a heater wall comprising another of said plenum walls and disposed facing and spaced from the heater wall of the other plenum of the pair, impeller inlet means on said heater wall aligned with said impeller heater means disposed on said heater wall at the inlet means for heating fluid drawn from said enclosure before the fluid reaches said impeller means, the respective nozzle plate for each plenum in the pair being generally coplanar with the nozzle plate of the other such plenum so that both nozzle plates discharge against the workpiece in generally the same direction, the inlet means of each plenum protruding from its respective heater wall and overhanging at least a portion of the other plenum in the pair.

2. An impingement oven module according to claim 1 further comprising workpiece conveyor means disposed within said housing for transporting discrete workpieces through said enclosure;

said pair of plenum chambers being disposed so their nozzle plates exhaust against one side of the conveyor means;

a second such pair of plenum chambers disposed on the vertically opposite side of the conveyor means so that their nozzle plates exhaust against the other side of the conveyor means.

3. An impingement oven module according to claim 1 further comprising insulation means applied to said side, bottom, and top walls of said housing.

4. An impingement oven module according to claim 1 wherein said nozzle plate comprises a planar member having a plurality of perforations therethrough of a predetermined size and location each perforation comprising said means for exhausting heated fluid from within its plenum.

5. An impingement oven module for heating a general and planar workpiece according to claim 1 further comprising workpiece conveyor means disposed within said housing for transporting workpieces through said enclosure mostly adjacent to the respective nozzle plates for the plenum chambers in said pair.

6. An impingement oven module according to claim 5 further comprising inwardly facing channel means supporting the edges of said conveyor means, which edges are disposed therein.

7. An oven comprising a plurality of serially arranged modules each according to claim 1 and further comprising workpiece conveyor means disposed to pass or convey from one module to the serially next module a workpiece in heat exchange relationship with the respective elongated nozzle plates of each plenum chamber and serially;

said pair of plenum chambers within each module being disposed so their nozzle plates exhaust against one side of the conveyor means substantially normally to the direction of conveyor means travel; and a second such pair of plenum chambers disposed on the vertically opposite sides of the conveyor means in each such module so that their respective nozzle plates exhaust similarly against the other side of the conveyor means and for that matter any workpiece conveyed thereon.

8. An oven according to claim 7 further comprising a drive system providing a stop and go advance of said conveyor means from one end of said oven to the other.

9. An oven according to claim 7 further comprising insulation covering the side, bottom, and top walls of said respective housings of said modules, and insulation on the housing end walls at the extreme ends of said oven.

10. An impingement oven module according to claim 1 further comprising an additional such pair of plenum chambers disposed horizontally adjacent to the first said pair of such plenum chambers and within said housing with said impeller means in horizontally alternate plenums being aligned for mounting on a common shaft; and a shaft on which is mounted alternate ones of said impeller means.

11. An impingement oven module according to claim 1 further comprising an additional such pair of plenum chambers disposed horizontally adjacent to the first said pair of such plenum chambers and within said housing with said impeller means being aligned for mounting on a common shaft;

a shaft on which is mounted alternate ones of said impeller means; and third and fourth such pairs of plenum chambers disposed on the vertically opposite side of the conveyor means so that their respective nozzle plates exhaust against the other side of the conveyor means substantially opposite to said first said and second said plenum chambers.

12. An impingement oven module according to claim 1 wherein each plenum chamber is approximately triangular in side elevation and has a substantially horizontal nozzle plate.

13. An impingement oven module according to claim 2 wherein each plenum chamber is approximately triangular side elevation with a substantially horizontal nozzle plate; and drive means for said gas impeller means to cause a higher pressure above said conveyor means than below it.

14. An impingement oven module according to claim 1 wherein said heater means further comprises a plurality of convective tubular heat exchangers disposed upstream of said gas pump means and substantially normal to the flow of heating medium and protruding to overhang as aforesaid.

15. An impingement oven module according to claim 14 wherein said heater means further comprises said heat exchangers being disposed in a substantially cylindrical pattern.

16. An impingement oven module according to claim 15 wherein said heater means further comprises members generally coaxial of said cylinder and composed of a plurality of said tubular exchangers connected to form an arc of said cylinder.

17. A method for heating a plastic chip of thermoplastic resin by impingement convection heating from opposite sides of a substantially flat or planar chip comprising the steps of disposing the chip on a perforate support between opposed nozzles but not slots;

directing from said nozzles streams of heated gaseous heating medium;

passing the chip along a predetermined path between said opposed nozzles while directing said streams to impinge against said chip sides for a distance and time sufficient to heat same to a predetermined temperature; and providing a differential pressure vertically across said chip with a higher gas pressure above said chip that is sufficient to prevent levitation and other aerodynamic effects.

18. A heating method according to claim 17 wherein a closed loop path within a housing is provided to recycle heating medium from convective contact with said chip past a heating means and then past a heating medium circulation means.

19. An impingement oven module for heating a generally planar discrete workpiece of resin by directing a flow of heated fluid substantially normally against a surface of the workpiece comprising a housing defining an enclosure within which occur heating and heated gaseous fluid flow and having side, bottom, top and end walls and within said enclosure a pair of plenum chambers arranged one above the other each plenum chamber having an elongated nozzle plate extending in machine direction and a plurality of plenum walls defining said plenum, said nozzle plate being means for defining a perforate one of said plenum walls and for exhausting heated fluid substantially normally against a workpiece surface gaseous pump impeller means within the walls of said plenum for removing fluid from within said housing and discharging fluid within the plenum for exhaust through said nozzle plate, a heater wall comprising another of said plenum walls and disposed substantially vertically relative to the heater wall of the other plenum of the pair, impeller inlet means on said heater wall, impeller heater means disposed on said heater wall at the inlet means for heating fluid drawn from said enclosure before the fluid reaches said impeller means, the respective nozzle plate for each plenum in the pair being generally parallel with the nozzle plate of the other such plenum so that both nozzle plates discharge against the workpiece from generally opposite directions, and the inlet means of both plenums protruding outwardly in substantially the same direction from its respective heater wall; and a conveyor means for transporting said workpiece in said machine direction along a generally horizontal path between said nozzle plates and providing a machine direction slot to exhaust heated fluid from between said nozzle plates to within said enclosure.

20. An oven comprising a plurality of serially arranged modules each according to claim 19 and further comprising said workpiece conveyor means being disposed to pass or convey from one module to the serially next module a workpiece in heat exchange relationship with the respective elongated nozzle plates of each plenum changer and serially;

said pair of plenum chambers within each module being of triangular shape and disposed so their nozzle plates exhaust against opposite sides of the conveyor means substantially normally to the direction of conveyor means travel;

a second such pair of plenum chambers disposed horizontally adjacent to the aforesaid pair with each of the second pair on the vertically opposite sides of the conveyor means in each such module so that their respective nozzle plates exhaust similarly against another portion of the conveyor means, and the inlet means of each plenum overhanging the other plenum in each pair.

21. An oven according to claim 19 further comprising a drive system providing a stop and go advance of said conveyor means from one end of said oven to the other.

22. An impingement oven module according to claim 19 wherein said heater means is an electric resistance heater disposed in the flow path of heated fluid to said inlet means.

* * * * *